United States Patent

[11] 3,624,046

| | | | | |
|---|---|---|---|---|
| [72] | Inventors | Roger Charle<br>Soisy sur Montmorency;<br>Gregorire Kalopissis, Paris; Andre Viout, Paris; Jean Gascon, Paris; Constantin Aretos, Paris, all of France | [52] | U.S. Cl.................................................. 260/78 UA,<br>8/54 R, 117/141 R, 260/29.6 HN, 260/78 SC,<br>260/78.4 R, 260/78.5 T, 260/561 S, 424/71 R |
| [21] | Appl. No. | 28,272 | [51] | Int. Cl.................................................. C08g 20/38 |
| [22] | Filed | Apr. 21, 1970 | [50] | Field of Search.......................................... 260/78 U,<br>79, 561 S; 424/71 |
| [45] | Patented | Nov. 30, 1971 | | |
| [73] | Assignee | L'Oreal<br>Parris, France | [56] | References Cited<br>UNITED STATES PATENTS |
| [32] | Priority | Aug. 5, 1965 | 2,749,331 | 6/1956 Breslow........................ 260/78 |
| [33] | | France | | |
| [31] | | 27374 | | |
| | | Continuation of application Ser. No. 565,371, July 15, 1966, now abandoned. This application Apr. 21, 1970, Ser. No. 28,272 | | |

*Primary Examiner*—Harold D. Anderson
*Attorney*—Cushman, Darby & Cushman

ABSTRACT: A polymer having a polyanhydride homopolymer polymer chain and amide bonded mercapto side chains that will react with keratin fibers.

[54] POLYSULPHYDRYL HOMOPOLYMERS, AND METHODS OF PREPARING AND APPLYING SAME
5 Claims, No Drawings

POLYSULPHYDRYL HOMOPOLYMERS, AND METHODS OF PREPARING AND APPLYING SAME

This application is a continuation of application Ser. No. 565,371, filed July 15, 1966, now abandoned.

The present invention relates to new polysulfhydryl polymers which may be advantageously used to treat keratinic fibers such as hair.

These new polymers according to the invention may also be advantageously used to treat keratinic textile fibers in order to improve their original properties and facilitate their being colored by dyes, and especially reactive dyes.

It is an object of the present invention to provide a new article of manufacture which consists of a polysulfhydrl polymer characterized by the fact that it comprises an anhydride homopolymer onto which at least one mercapto-amine has been condensed.

In accordance with the invention, the homopolymer may be polymaleic anhydride, polyitaconic anhydride, polyacrylic anhydride, a polyacrylic-methacrylic anhydride mixture, or a polymethacrylic anhydride, but this list is not be considered exhaustive.

Aminothiols having the following formula may be used to sulfhydrylize the homopolymers according to the invention:

$$HS-R-NH-R'$$

In this formula:

R designates either an alkylene radical having preferably from two to four carbon atoms, which may be substituted by lower alkyls which may have up to four carbon atoms, by a carboxyl radical, or by a carbalkoxy group, and R' designates a hydrogen atom or a lower alkyl such as —$CH_3$ or —$C_2H_5$.

Among the aminothiols corresponding to the foregoing formula, the following may be cited by way of example:
β-mercaptoethylamine,
cysteine, and
ethylcysteinate.

Mercapto-amide amines responding to the following formula may also be used to polysulfhydrylize the homopolymers:

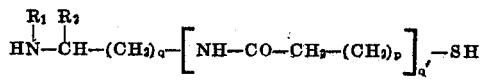

In this formula:

$R_1$ represents —H, —$CH_3$, —$C_2H_5$, or —$CH_2$—$CH_2$—OH
$R_2$ represents —H or —COOH
q is a whole number between 1 and 5 inclusive,
q' is equal to 0 or 1,
q is equal to 0 or 1.

Among the mercapto-amide amines responding to this last formula are those obtained from the esters of thioglycolic acid, thiolactic acid, or β-mercaptoproprionic acid, and diamines such as ethylene diamine, hexamethylene diamine, and N-hydroxyethyl ethylene diamine.

In accordance with the invention it is also possible to condense amines which have no —SH groups on the anhydride homopolymers at the same time that the mercapto-amines are condensed thereon.

In this way the proportionate number of —SH groups in the polysulfhydryl homopolymers may be reduced, while introducing into the formula of the polymer groups which permit it to impart particular qualities to the hair.

For example, alkylamines responding to the following formula may be condensed on the homopolymer at the same time as the mercapto-amines:

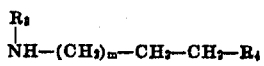

In this formula:

$R_3$ represents a hydrogen atom or a lower alkyl, $R_4$ represents either a hydrogen atom or a lower alkyl or a radical having the formula

in which r and r' are identical or different lower alkyls, or may be part of a heterocycle such as that of morpholine or piperidine, m is a whole number equal to 2, 3 or 4.

Among the compounds responding to the above formula are: butylamine, N,N-diethylpropylene diamine and N,-(β-aminoethyl)-morpholine, but this list is not exhaustive.

When partial sulfhydryl homopolymers are being prepared in accordance with the invention, it is possible to vary the proportions of the mercapto-amine and nonsulfhydryl diamine on the homopolymer within broad limits ranging for example from 1 to 99 percent, but preferably from 20 to 80 percent of mercapto-amine in proportion to the nonsulfhydryl amine.

Another object of the present invention is to provide a method of preparing a polysulfhydryl homopolymer characterized by the fact that the anhydride in question is first homopolymerised, after which those amines corresponding to the desired formula are condensed on the homopolymer thus produced.

A further object of the present invention is to provide a new article of manufacture which consists of a composition for treating the hair which is essentially characterized by the fact that it contains at least one polysulfhydryl homopolymer such as has just been described.

This cosmetic composition according to the invention may be a hair setting lotion in the form of an aerosol.

A still further object of the present invention is to provide a new process for treating keratinic textile fibers, particularly in order to facilitate denying them with reactive dyes, said process being essentially characterized by the fact that the keratinic fibers are impregenated with at least one polysulfhydryl homopolymer as hereinbefore defined.

Yet another object of the present invention is to provide a new article of manufacture which is made of keratinic textile fibers which have been impregnated with a polysulfhydryl homopolymer as hereinbefore defined.

The polysulfhydryl homopolymers according to the invention have certain advantages over those polysulfhydryl polymers heretofore known when used in either the cosmetic or the industrial textile field.

In the first place those homopolymers which are formed by polymerizing an anhydride are capable of combining with a polymers heretofore known, which were larger number of —SH groups than the polysulfhydryl polymers heretofore known, which were made from resins which were copolymers of an anhydride and another monomer which did not combine with SH groups.

This properly enables homopolymers according to the invention to exhibit a much higher reactivity toward keratinic substances.

Moreover, treatments utilizing homopolymers according to the invention are more consistent and homogenous in their effects than treatments utilizing those polysulfhydryl polymers heretofore known. In effect, during the polymerization of the copolymers, the proportions of the two monomers comprised by the copolymers vary from one molecule to the next and the products obtained may therefore differ in two ways, to wit:—firstly according to the lengths of their chains, and secondly according to the proportion between the two monomers making up the copolymers.

On the other hand, the homopolymers according to the invention all have the same chemical structure, the only possible difference between one molecule and another being a difference in the lengths of their chains.

It follows that the homopolymers according to the invention are more easily reproduced and consequently produce more consistent results when they are applied to keratinic fibers.

In order that the invention may be more clearly understood, several methods of carrying it out will now be described, purely by way of example.

EXAMPLE 1

Preparation of the polymaleic anhydride responding to the formula:

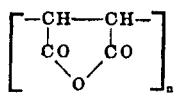

Eight hundred grams of maleic anhydride and 1,000 ml. of dry benzene are placed in a flask provided with agitating means, cooling means, a thermometer, a bromine ampul and a tube for introducing nitrogen.

The mixture is brought to reflux and 104 g. of 85 percent benzoyl peroxide (i.e., 88 g. at 100 percent, or 11 percent by weight in proportion to the monomer) dissolved in 960 ml. of benzene is added little by little over 32 hours.

After heating for several hours, the polymer begins to precipitate. At the end of the heating and after cooling, the slightly colored precipitate is dried. It is then washed several times with benzene and dried in the air. The yield is 632 g. (about 79 percent) of a product in the form of a clear yellow powder.

Tests show that the proportion of anhydride is 100 percent.

The specific viscosity of a 1 percent solution of this polymer in dimethyl formamide at 25° C. is 0.05.

EXAMPLE 2

Preparation of the polyitacomic anhydride responding to the formula:

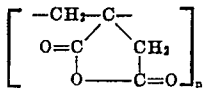

One hundred and forty grams of itaconic anhydride (having a melting point of 66°–67°) and 1,400 ml. of dry benzene are placed in a flask provided with agitating means, cooling means, a thermometer, a bromine ampul, and a tube for introducing nitrogen.

The mixture is brought to reflux and 28 g. of 85 percent benzoyl peroxide (i.e. 24 g. at 100 percent or 17 percent by weight in proportion to the monomer) is introduced in 8 hours.

At the end of this reaction time the polymer is drained, washed, and dried. One hundred and ten grams (representing a 78.5 percent yield) of a white powder results. This will not fuse at 200° C.

It should also be noted that the monomer is soluble in a mixture of ether and chloroform, whereas the polymer is insoluble in this same mixture.

Testing has shown that the proportion of anhydride is 99 percent.

The specific viscosity of a 1 percent solution of this product in dimethylformamide at 25° C. is 0.06.

EXAMPLE 3

Preparation of the polyacrylic anhydride responding to the formula:

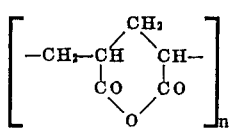

Two thousand milliliters of toluene and 5 g. of lauryl mercaptan are placed in a flask provided with agitating means, cooling means, a thermometer, a bromine ampul and a tube for introducing nitrogen.

This is brought to reflux and 14.5 g. of 85 percent benzoyl peroxide (i.e. 12.3 g. at 100 percent or 12.3 percent by weight in proportion to the monomer), dissolved in 150 ml. of toluene, is added.

While keeping the mixture at reflux, 100 g. of freshly distilled acrylic anhydride is rapidly introduced. Polymerization is practically instantaneous. The mixture is heated for an additional 15 minutes, cooled, and after drying, washed first with benzene and then with petroleum ether.

The result is 100 g. (a 100 percent yield) of a bulky electrostatic white powder.

Testing indicates that the proportion of anhydride is 100 percent.

The specific viscosity of a 1 percent solution of the polymer in 2 N sodium hydroxide at 25 percent is 0.15.

EXAMPLE 4

Preparation of a mixed polyacrylic-methacrylic anhydride responding to the formula:

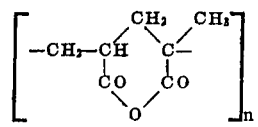

The procedure is the same as in example 3, except that the process starts with a mixed acrylic-methacrylic anhydride monomer which has been freshly distilled instead of with the acrylic anhydride monomer.

The result is 89 g. (an 89 percent yield) of a bulky electrostatic white powder.

Testing indicates that the proportion of anhydride is 100 percent.

The specific viscosity of a 1 percent solution of the polymer in 2 N sodium hydroxide at 25° C. is 0.14.

EXAMPLE 5

Preparation of the polymethacrylic anhydride responding to the formula:

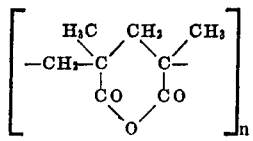

The procedure is the same as in example 3, except that the acrylic anhydride is replaced by methacrylic anhydride.

The result is 55 g. (a 55 percent yield) of a more dense and less electrostatic white powder.

Testing shows that the proportion of anhydride is 100 percent.

The specific viscosity of a 1 percent solution of the polymer in 2 N sodium hydroxide at 25° C. is 0.11.

EXAMPLE 6

Preparation of a polysulfhydryl homopolymer responding to the formula:

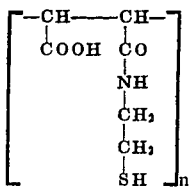

by condensation of β-mercaptoethylamine on polymaleic anhydride.

The starting material is polymaleic anhydride prepared as described in example 1.

In order to condense the β-mercaptoethylamine, 126 g. (1 mol) of 90 percent β-mercaptoethylamine hydrochloride and 25 ml. of water are placed in a flask provided with agitating means, a thermometer, a bromine ampul, and a tube for introducing nitrogen.

Forty grams (1 mol) of sodium hydroxide tablets is added while cooling, so as to liberate the amine from its hydrochloride. While agitating and cooling, 49 g. (0.5 mols) polymaleic of anhydride is added, and then 20 g. (0.5 mols) of sodium hydroxide tablets to liberate the amine function by salification of the carboxyl of the polymer.

Forty-nine grams (0.5 mols) of the polymer and 20 g. (0.5 mols) of NaOH tablets are then added simultaneously.

When the reaction has been completed, the product is acidified with concentrated hydrochloric acid.

The precipitate is washed with water and then vacuum dried.

The result is 133 g. (a 76 percent yield by weight) of the polysulfhydryl polymer according to the invention.

This polymer, which after drying takes the form of a powder which is soluble in water at an alkaline pH, analyzes as follows:

SH percent calculated     18.85
SH percent found     10.3

After reduction of the oxidized portion of the product, reanalysis yields the following result:

SH percent calculated     18.85
SH percent found     12.94

EXAMPLE 7

A polysulfhydryl polymer according to the invention, which has the following formula:

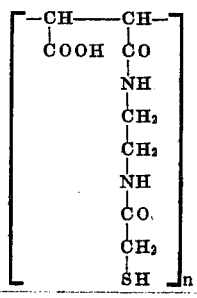

is prepared by condensing N(β-aminoethyl) thioglycolamide on polymaleic anhydride.

The procedure is the same as that in example 6, except that the β-mercaptoethylamine is replaced by a molecularly equivalent quantity of N(β-aminoethyl)thioglycolamide.

The result is a yield of 75 percent by weight (169 g.) of a powder which is soluble in water at an alkaline pH. Analysis of this powder yields the following result:

SH percent calculated     14.2
SH percent found     7.7

After reducing the oxidized form of the product, analysis yields the following result:

SH percent calculated     14.2
SH percent found     10.4

EXAMPLE 8

A partial sulfhydryl polymer responding to the formula:

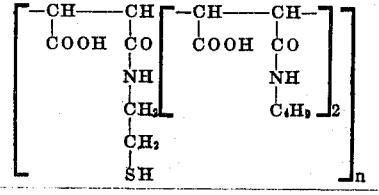

is prepared by condensing β-mercaptoethylamine and N-butylamine on polymaleic anhydride which has been prepared as described in example 1. The procedure is as follows:

Forty-two grams (0.33 mols) of 92 percent β-mercapto-ethylamine, 49 g. (0.66 mols) of N-butylamine, and 400 ml. of water are placed in a flask provided with agitating means, cooling means, a thermometer, a bromine ampul and a tube for introducing nitrogen.

The amine is then liberated from its hydrochloride by adding 13.4 g. (0.33 mols) of sodium hydroxide tablets, while cooling.

Forty-nine grams (0.5 mols) of polymaleic anhydride is then added while agitating and cooling the mixture, and followed by 20 g. (0.5 mols) of sodium hydroxide tablets to liberate the amine function by salification of the carboxyl of the polymer.

Forty-nine grams (0.5 mols) of polymer and 20 g. (0.5 mols) of sodium hydroxide tablets are then added simultaneously.

After completion of the reaction, the product is acidified with concentrated hydrochloric acid.

The precipitate is washed with water and then vacuum dried.

The result is a yield of 62 percent by weight (107 g.) of the polymer according to the invention.

This polymer is in the form of a powder which is soluble in water at an alkaline pH, ad has the following analysis:

SH percent calculated     6.4
SH percent found     2.8

After reduction of the oxidized form of the product, the analysis becomes:

SH percent calculated     6.4
SH percent found     5.3

EXAMPLE 9

A partial polysulfhydryl polymer according to the invention is prepared, which polymer responds to the formula:

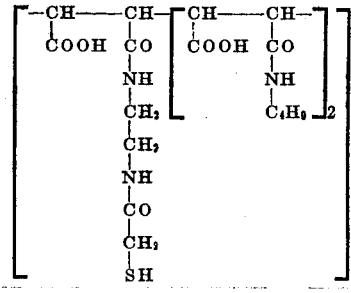

The procedure is the same as that described in example 8, except that the β-mercapto-ethylamine is replaced by a molecularly equivalent quantity of N(β-aminoethyl)-thioglycolamide.

The result is 133 grams, representing a yield of 70 percent by weight, of a powder which is soluble in water at an alkaline pH, and which analyzes as follows:

SH percent calculated     5.75
SH percent found     3.15

After reduction of the oxidizes form of the product, the result is as follows:

SH percent calculated     5.75
SH percent found     3.9

EXAMPLE 10

A partial polysulfhydryl polymer having the following formula is prepared:

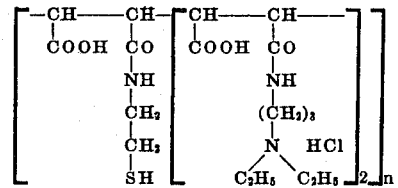

The method of operation is the same as described in example 8, except that the N-butylamine is replaced by a molecularly equivalent quantity of N,N-diethyl-propylenediamine.

There is thus obtained a yield of 57 percent by weight (133 g.) of a powder which is soluble in water at an alkaline or neutral pH.

This water-soluble polymer has not been washed and consequently contains sodium chloride.

Analysis yields the following results:
SH percent calculated 4.7
SH percent found 2.4

After reduction of the oxidized form of the product the analysis is:
SH percent calculated 4.7
SH percent found 4.3

EXAMPLE 11

A partial polysulfhydryl polymer having the following formula:

$$\left[\begin{array}{cccc} -CH- & CH-CH- & CH- \\ COOH & CO & COOH & CO \\ & NH & & NH \\ & CH_2 & & (CH_2)_3 \\ & CH_2 & & N \diagup \diagdown \; HCl \\ & NH & & C_2H_5 \; C_2H_5 \\ & CO & & \\ & CH_2 & & \\ & SH & & \end{array}\right]_n$$

is prepared by condensing N($\beta$-aminoethyl)thioglycolamide and N,N-diethylaminopropylamine on polymaleic anhydride in the following manner:

Sixty-seven grams (0.5 mols) of N($\beta$-aminoethyl)-thioglycolamide, 65 g. (0.5 mols) of N,N-diethylaminopropylamine, and 600 ml. of water are placed in a flask provided with agitating means, cooling means, a thermometer, a bromine ampul and a tube for introducing nitrogen.

Forty-nine grams (0.5 mols) of polymaleic anhydride is added while agitating and cooling the mixture. Twenty grams (0.5 mols) of sodium hydroxide tablets are then added to liberate the amine function by salification of the carboxyl of the polymer.

Forty-nine grams (0.5 mols) of polymer and 20 g. (0.5 mols) of sodium hydroxide tablets are then added.

At the end of the reaction, the product is acidified with concentrated hydrochloric acid.

The result is a yield of 99 g. (40 percent by weight) of the polymer according to the invention.

This product is in the form of a powder which is soluble in water at neutral and alkaline pH values.

This water-soluble powder has not been washed and therefore contains sodium chloride.

Analysis yields the following results:
SH percent calculated 6.65
SH percent found 3.45

After reduction of the oxidized form of the product the analysis is:
SH percent calculated 6.65
SH percent found 4.66

EXAMPLE 12

A partial sulfhydryl polymer having the following formula is prepared:

$$\left[\begin{array}{cccc} -CH- & CH-CH- & CH- \\ COOH & CO & COOH & CO \\ & NH & & NH \\ & CH_2 & & CH_2 \\ & CH_2 & & CH_2 \\ & SH & & O \\ & & & (CH_2)_2 \\ & & & OH \end{array}\right]_n$$

The method is the same as that described in example 11, except that the N($\beta$-aminoethyl)-thioglycolamide is replaced by $\beta$-mercaptoethylamine and the N,N-diethylaminopropylamine by diglycolamine in molecularly equivalent quantities.

The yield is 100 g. (55 percent by weight) of a powder which is soluble in water under alkaline conditions.

The following analysis has been made:
SH percent calculated 8.75
SH percent found 4.5

After reduction of the oxidized form of the product the analysis is:
SH percent calculated 8.75
SH percent found 6.4

EXAMPLE 13

A polysulfhydryl polymer having the formula:

$$\left[\begin{array}{cc} -CH_2-C- \\ CO \diagup \diagdown CH_2 \\ OH \quad CO \\ \quad NH \\ \quad CH_2 \\ \quad CH_2 \\ \quad SH \end{array}\right]_n$$

is prepared by condensing $\beta$-mercaptoethylamine on polyitaconic anhydride prepared as in example 2. The procedure is the same as in example 6, except that the polymaleic anhydride is replaced by polyitaconic anhydride.

The result is 156 g. (a yield of 83 percent by weight) of a powder which is soluble in water at an alkaline pH and which analyzes as follows:
SH percent calculated 17.45
SH percent found 12.4

After reduction of the oxidized form of the product the result is:
SH percent calculated 17.45
SH percent found 17.08

EXAMPLE 14

A polysulfhydryl polymer having the formula:

$$\left[\begin{array}{cc} -CH_2-C- \\ COOH \diagdown CH_2 \\ \quad CO \\ \quad NH \\ \quad CH_2 \\ \quad CH_2 \\ \quad NH \\ \quad CO \\ \quad CH_2 \\ \quad SH \end{array}\right]_n$$

is prepared by condensing N($\beta$-aminoethyl)thioglycolamide on polyitaconic anhydride.

The procedure is the same as described in example 7, except that the polymaleic anhydride is replaced by polyitaconic polyanhydride.

The result is 141 g. (a yield of 58 percent by weight) of a powder which is soluble in water under alkaline conditions, and which analyzes as follows:
SH percent calculated 13.4
SH percent FOUND 8.75

After reduction of the oxidized form of the product, the analysis becomes:
SH percent calculated 13.4
SH percent found 11.7

EXAMPLE 15

A partial polysulfhydryl polymer having the following formula is prepared:

$$\left[ \begin{array}{c} -CH_2-C\underset{COOH}{\diagdown}\underset{CH_2}{\diagup}CH_2-C\underset{COOH}{\diagdown}\underset{CH_2}{\diagup} \\ \phantom{xxxx}\underset{CO}{|}\phantom{xxxxxxx}\underset{CO}{|} \\ \phantom{xxxx}\underset{NH}{|}\phantom{xxxxxxx}\underset{NH}{|} \\ \phantom{xxxx}\underset{CH_2}{|}\phantom{xxxxxxx}\underset{(CH_2)_3}{|} \\ \phantom{xxxx}\underset{CH_2}{|}\phantom{xxxxxxx}\underset{N}{\diagup}\!\!\diagdown\phantom{x}HCl \\ \phantom{xxxx}SH\phantom{xxxxxxx}C_2H_5\phantom{x}C_2H_5 \end{array} \right]_n$$

The procedure is the same as described in example 11, except that the polymaleic anhydride is replaced by polyitaconic anhydride and the N(β-aminoethyl)-thioglycolamide by β-mercapto-ethylamine.

The result is 160 g. (a yield of 69 percent by weight) of a powder which is soluble in water under neutral and basic conditions.

This water-soluble polymer has not been washed and therefore contains sodium chloride.

Analysis yields the following results:
SH percent calculated    7.05
SH percent found    5.7

After reduction of the oxidized form of the product, this becomes:
SH percent calculated    7.05
SH percent found    6.1

EXAMPLE 16

A polysulfhydryl polymer having the following formula is prepared:

$$\left[ \begin{array}{c} \phantom{xxx}CH_2 \\ -CH_2-CH\diagdown\phantom{x}CH- \\ \phantom{xxxx}\underset{CO}{|}\phantom{xxx}\underset{CO}{|} \\ \phantom{xxxx}\underset{OH}{|}\phantom{xxx}\underset{NH}{|} \\ \phantom{xxxxxxxx}\underset{CH_2}{|} \\ \phantom{xxxxxxxx}\underset{CH_2}{|} \\ \phantom{xxxxxxxx}SH \end{array} \right]_n$$

The procedure is the same as described in example 6, except that the polymaleic anhydride is replaced by the polyacrylic anhydride described in example 3.

The result is 177 g. (a yield of 85 percent by weight) of a white powder which is soluble in water at an alkaline pH, and which analyzes as follows:
SH percent calculated    16.25
SH percent found    13.1

After reduction of the oxidizes form of the product, the analysis becomes:
SH percent calculated    16.25
SH percent found    14.5

EXAMPLE 17

A polysulfhydryl polymer having the following formula is prepared:

$$\left[ \begin{array}{c} \phantom{xxx}CH_2 \\ -CH_2-CH\diagdown\phantom{x}CH- \\ \phantom{xxxx}\underset{COOH}{|}\phantom{xx}\underset{CO}{|} \\ \phantom{xxxxxxxx}\underset{NH}{|} \\ \phantom{xxxxxxxx}\underset{CH_2}{|} \\ \phantom{xxxxxxxx}\underset{CH_2}{|} \\ \phantom{xxxxxxxx}\underset{NH}{|} \\ \phantom{xxxxxxxx}\underset{CO}{|} \\ \phantom{xxxxxxxx}\underset{CH_2}{|} \\ \phantom{xxxxxxxx}SH \end{array} \right]_n$$

The procedure is the same as described in example 6, except that the polymaleic anhydride is replaced by polyacrylic anhydride and the β-mercaptoethylamine by N(β-aminoethyl)-thioglycolamide.

The result is 163 g. (a yield of 63 percent by weight) of a white powder which is soluble in water under alkaline conditions and which analyzes as follows:
SH percent calculated    12.7
SH percent found    7.86

After reduction of the oxidized form of the product, the analysis becomes:
SH percent calculated    12.7
SH percent found    10.0

EXAMPLE 18

A polysulfhydrul copolymer having the following formula is prepared:

$$\left[ \begin{array}{c} \phantom{xx}CH_2\phantom{xxxxxxxxxxx}CH_2 \\ -CH_2-CH\diagdown\phantom{x}CH-CH_2-CH\diagdown\phantom{x}CH- \\ \phantom{xxxx}\underset{COOH}{|}\phantom{x}\underset{CO}{|}\phantom{xxxxx}\underset{COOH}{|}\phantom{x}\underset{CO}{|} \\ \phantom{xxxxxxxx}\underset{NH}{|}\phantom{xxxxxxxxx}\underset{NH}{|} \\ \phantom{xxxxxxxx}\underset{CH_2}{|}\phantom{xxxxxxxxx}\underset{(CH_2)_3}{|} \\ \phantom{xxxxxxxx}\underset{CH_2}{|}\phantom{xxxxxxxxx}\underset{N}{\diagup}\!\!\diagdown\phantom{x}HCl \\ \phantom{xxxxxxxx}SH\phantom{xxxxxxxxx}C_2H_5\phantom{x}C_2H_5 \end{array} \right]_n$$

The procedure is the same as described in example 11, except that the polymaleic anhydride is replaced by polyacrylic anhydride and the N(β-aminoethyl)-thioglycolamide by β-mercapto-ethylamine.

The result is 164 g. (a yield of 67 percent by weight) of a while powder is soluble in water at alkaline and neutral pH values.

This water-soluble polymer has not been washed and consequently contains sodium chloride.

Analysis yields the following results:
SH percent calculated    6.66
SH percent found    5.9

After reduction of the oxidized form of the product, the analysis becomes:
SH percent calculated    6.66
SH percent found    6.5

EXAMPLE 19

A polysulfhydryl polymer having the following formula is prepared:

$$\left[ \begin{array}{c} \phantom{xx}CH_2\phantom{xxxxxxxxxxx}CH_2 \\ -CH_2-CH\diagdown\phantom{x}CH-CH_2-CH\diagdown\phantom{x}CH- \\ \phantom{xxxx}\underset{COOH}{|}\phantom{x}\underset{CO}{|}\phantom{xxxxx}\underset{COOH}{|}\phantom{x}\underset{CO}{|} \\ \phantom{xxxxxxxx}\underset{NH}{|}\phantom{xxxxxxxxx}\underset{NH}{|} \\ \phantom{xxxxxxxx}\underset{CH_2}{|}\phantom{xxxxxxxxx}\underset{C_4H_9}{} \\ \phantom{xxxxxxxx}\underset{CH_2}{|} \\ \phantom{xxxxxxxx}\underset{NH}{|} \\ \phantom{xxxxxxxx}\underset{CO}{|} \\ \phantom{xxxxxxxx}\underset{CH_2}{|} \\ \phantom{xxxxxxxx}SH \end{array} \right]_n$$

The procedure is the same as in example 11, except that the polymaleic anhydride is replaced by polyacrylic anhydride and the N,N-diethylamino-propylamine by N-butylamine.

The result is 188 g. (a yield of 82 percent by weight) of a white powder which is soluble in water under alkaline conditions.

This powder analyzes as follows:
SH percent calculated    7.2
SH percent found    4.46

After reduction of the oxidized form of the product, the analysis becomes:
SH percent calculated    7.2
SH percent found    6.54

EXAMPLE 20

A polysulfhydryl polymer having the following formula is prepared:

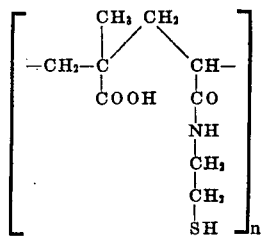

The procedure is the same as described in example 6, except that the polymaleic anhydride is replaced by the mixed polyacrylicmethacrylic anhydride described in example 4.

The result is 190 g. (a yield of 87.5 percent by weight) of a white powder which is soluble in water under alkaline conditions and which analyzes as follows:

SH percent calculated    15.2
SH percent found    9.04

After reduction of the oxidized form of the product, the analysis becomes:

SH percent calculated    15.2
SH percent found    15.2

EXAMPLE 21

A polysulfhydryl polymer having the following formula is prepared:

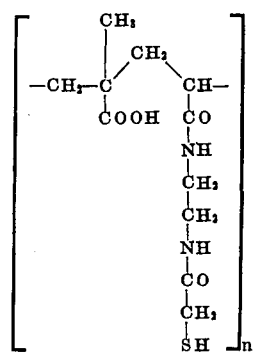

The procedure is the same as that described in example 6, except that the polymaleic anhydride is replaced by a mixed polyacrylic-methacrylic anhydride and the $\beta$-mercaptoethylamine by N($\beta$-aminoethyl)thioglycolamide.

The result is a yield of 76 percent by weight of a white powder which is soluble in water under alkaline conditions, and which analyzes, as follows:

SH percent calculated    12.05
SH percent found    8.5

After reduction of the oxidized form of the product, the analysis becomes:

SH percent calculated    12.05
SH percent found    9.2

EXAMPLE 22

A polysulfhydryl polymer having the following formula is prepared:

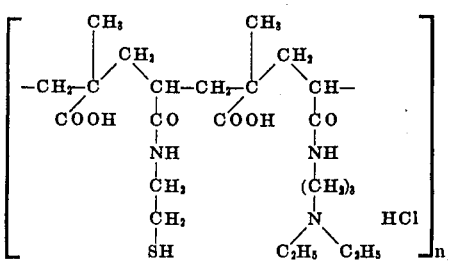

The procedure is the same as in example 11, except that the polymaleic anhydride is replaced by a mixed polyacrylic-methacrylic anhydride and the N($\beta$-aminoethyl)-thioglycolamide by $\beta$-mercaptoethylamine.

The product is 198 g. (a yield of 76 percent by weight) of a white powder which is soluble in water at neutral and alkaline pH values.

This polymer contains sodium chloride.

Analysis of this powder yields the following results:

SH percent calculated    6.3
SH percent found    4.35

After reduction of the oxidized form of the product, the analysis becomes:

SH percent calculated    6.3
SH percent found    5.6

EXAMPLE 23

A polysulfhydryl polymer having the following formula is prepared:

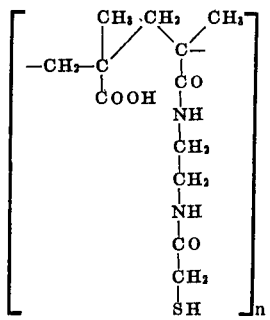

The procedure is the same as described in example 6, except that the polymaleic anhydride is replaced by polymethacrylic anhydride and the $\beta$-mercaptoethylamine by N($\beta$-aminoethyl)-thioglycolamide.

The product is 260 g. (a yield of 90 percent by weight) of a white powder which is soluble in water under alkaline or neutral conditions, and which analyzes as follows:

SH percent calculated    11.45
SH percent found    8.3

After reduction of the oxidized form of the product the analysis becomes:

SH percent calculated    11.45
SH percent found    9.3

EXAMPLE 24

A hair-setting lotion having the following composition:

product formed by condensing one-third mercaptoethylamine and two-thirds diethylamino-propylamine on polymaleic anhydride, as in example 10    3 g.
aminoethylpropanediol, q.s.p.    pH=7
ethyl alcohol, q.s.p.    25°
perfume    0.2 g.
water, q.s.p.    100 cc.

is prepared by first dissolving the resin in the water in the presence of aminoethylpropanediol. Ethyl alcohol and perfume are then added; the pH is adjusted with the above base, and the product completed by adding the quantity of water indicated.

In order to set the hair, 20 cm.³ of this lotion is applied to hair which has been washed and dried.

The hair is combed to distribute the lotion well, the hair is curled up on rollers, and dried.

After unrolling the hair, it is brushed out, and a set of excellent quality is obtained.

EXAMPLE 25

In the same manner as described in mercaptoethylamine foregoing example, a lotion having the following composition is prepared:

product resulting from the condensation of one-third mercaptoethylamine and two-thirds diethylaminopropyldride, on polymaleic anhydride, as in example 10 3.5 g.
aminoethylpropanol, q.s.p. pH=7
ethyl alcohol, q.s.p. 50°
water, q.s.p. 100 cc.

Sixty-five grams of the above solution is placed in an aerosol bomb containing 4 g. of butane to act as a propellant.

This lotion is then applied to the hair in the same way as in the preceding example, and the aerosol spray makes it easier to distribute the product evenly over the hair.

EXAMPLE 26

In the manner hereinbefore described, a setting lotion having the following composition is prepared:
product of the condensation of one-half mercaptoethylamine and one-half diglycolamine on polymaleic anhydride, according to example 12 3 g.
diglycolamine, q.s.p. pH=7
ethyl alcohol, q.s.p. 25°
perfume 0.2 g.
water, q.s.p. 100 cc.

The application of this lotion also results in a set of excellent quality.

EXAMPLE 27

In order to produce an aerosol foam for use as a setting lotion, a composition having the following formula is prepared:
product of the condensation of one-half mercaptoethylamine and one-half diglycolamine on polymaleic anhydride in accordance with example 12 4 g.
diglycolamine, q.s.p. pH=7
40 percent oxyethylenated sodium lauryl sulfate 1 g.
perfume 0.2 g.
water, q.s.p. 100 cc.

The first step is to solubilize the resin in water and in the presence of diglycolamine. An emulsifier which has first been dissolved in water is then incorporated into the lotion. The pH is adjusted to 7, using the same base, perfume is added, and the process is completed by adding sufficient distilled water to bring the total volume up to 100 cc.

Sixty grams of this solution is mixed in an aerosol bomb with 5 g. of a propellant, e.g., the fluorinated hydrocarbon sold under the trademark "Freon 12."

This aerosol bomb delivers a creamy foam which, when applied to hair which has been washed and dried, makes it much easier to comb and roll up on setting rollers.

The results are very satisfactory.

EXAMPLE 28

In order to produce a hair setting lotion the following composition is prepared and applied as in example 24:
product of the condensation of one-third mercaptoethylamine and two-thirds butylamine on a polymaleic anhydride polymer, as per example 8 3 g.
aminoethylpropanol, q.s.p. pH=8
ethyl alcohol, q.s.p. 20°
perfume 0.2 g.
water, q.s.p. 100 cc.

Equally good results are obtained.

The following solutions may be used to impregnate keratinic textile fibers, as has been indicated in the foregoing examples.

Solution A
Polysulfhydryl homopolymer obtained as indicated in example 9 3 g.
Ammonia solution at 22°B 4.5 cc.
Water, q.s.p. 100 cc.

Solution B
Polysulfhydryl homopolymer as indicated in example 15 1.1 g.
Ammonia solution at 22° B 2 cc.
Water, q.s.p. 100 cc.

Solution C
Polysulfhydryl homopolymer obtained as indicated in example 6 0.3 g.
Ammonia solution at 22° B 0.6 cc.
Water, q.s.p. 100 cc.

Solution D
Polysulfhydryl homopolymer obtained as indicated in example 18 1.1 g.
Ammonia solution at 22° B 2 cc.
Water, q.s.p. 100 cc.

EXAMPLE 29

Four grams of wool yarn is treated with solution A by immersion therein at the ambient temperature for 15 minutes. After drying, the yarn is rinsed with an N/10 acetic acid solution and dyed by immersion in a dyeing solution containing:
Cibacrone Blue 3 GA 0.12 g.
Glacial acetic acid 2 cc.
Water, q.s.p. 200 cc.

The dyeing takes places at a temperature of 80° C. over a period of 60 minutes. The yarn is rinsed lavishly with water and scoured at 50° C. for 20 minutes in 2 percent ammonia solution. It is again rinsed and boiled as usual when dyeing wool.

The result is a blue color.

EXAMPLE 30

Four grams of wool yarn is treated with solution A by immersion therein at room temperature for 15 minutes. After drying, the yarn is rinsed with an N/10 acetic acid solution and dyed by immersion in a dyeing solution containing:
Procion Red BS 0.12 g.
Glacial acetic acid 2 cc.
Water, q.s.p. 200 cc.

The wool is dyed at 80° C. over a period of 60 minutes. It is then rinsed lavishly with water and scoured at 50° C. for 20 minutes in a 2 percent ammonia solution. It is again rinsed and boiled as usual when dyeing wool.

The result is a beautiful red color.

EXAMPLE 31

Four grams of woolen yarn is treated with solution B by immersing it therein at the ambient temperature for 15 minutes. After drying the yarn is rinsed with an N/10 acetic acid solution and dyed by immersing it in a dyeing solution containing:
Cibacrone Blue 8 GA 0.12 g.
Glacial acetic acid 2 cc.
Water, q.s.p. 100 cc.

The dyeing takes place at a temperature of 100° C. over a period of 60 minutes. The wool is lavishly rinsed with water and scoured at 50° C. for 20 minutes in a 2 percent ammonia solution. It is again rinsed and boiled as usual when dyeing wool.

A beautiful blue color results.

EXAMPLE 32

Four grams of woolen yarn is treated with solution B by immersing it at the ambient temperature for 15 minutes. After drying, it is rinsed with an N/10 acetic acid solution and dyed by immersing it in a dyeing solution comprising:
Cibacrone Red brown RP 0.12 g.
Glacial acetic acid 2 cc.
Water, q.s.p. 200 cc.

The dyeing takes place at a temperature of 100° C. over a period of 60 minutes. The wool is rinsed lavishly with water and scoured at 50° C. for 20 minutes in 2 percent ammonia solution. It is again rinsed and boiled as is usual when dyeing wool.

The result is a reddish brown color.

EXAMPLE 33

Four grams of woolen yarn is treated with solution C by immersing it therein, at a temperature of 50° C. for 30 minutes. After drying, it is rinsed with an N/10 acetic acid solution and dyed by immersion in a dyeing solution containing:

| | |
|---|---|
| Procion Red 5 BS | 0.12 g. |
| Glacial acetic acid | 2 cc. |
| Water, q.s.p. | 200 cc. |

The dyeing takes place at a temperature of 50° C. over a period of 60 minutes. The wool is rinsed lavishly with water and then scoured at 50° C. for 60 minutes in a 2 percent ammonia solution. It is again rinsed and boiled as usual when dyeing wool.

A beautiful red color results.

EXAMPLE 34

Four grams of woolen yarn is treated with solution C by immersion therein at a temperature of 50° C. for 30 minutes. After drying, it is rinsed with a solution of N/10 acetic acid and dyed by immersion in a dyeing solution containing:

| | |
|---|---|
| Cibacrone Scarlet RP | 0.12 g. |
| Glacial acetic acid | 2 cc. |
| Water, g.s.p. | 200 cc. |

The dyeing is carried out at a temperature of 50° C. for 60 minutes. The yarn is rinsed lavishly with water and scoured at 50° C. for 60 minutes in a 2 percent ammonia solution. It is again rinsed and boiled as is usual when dyeing wool.

A scarlet red color results.

EXAMPLE 35

Four grams of woolen yarn is treated with solution D by immersion therein at a temperature of 50° C. for 30 minutes. After drying, the yarn is rinsed with an N/10 acetic acid solution and dyed by immersion in a dyeing solution containing:

| | |
|---|---|
| Cibacrone Olive RP | 0.12 g. |
| Glacial acetic acid | 2 cc. |
| Water, q.s.p. | 200 cc. |

The dyeing is carried out at a temperature of 100° C. over a period of 20 minutes. The wool is then rinsed lavishly with water and then scoured for 60 minutes in a 2 percent ammonia solution.

It is again rinsed and boiled as is usual when dyeing wool.

A beautiful olive green color results.

We claim:

1. A solid polymer, soluble in a solvent selected from the group consisting of water, lower alkanol and their mixtures, said polymer consisting essentially of the condensation reaction product of (1) ethylenically unsaturated carboxylic acid anhydride homopolymer selected from the group consisting of poly(maleic anhydride), poly(itaconic anhydride), poly(acrylic anhydride), poly(acrylic-methacrylic anhydride) and poly(methacrylic anhydride), (2) a mercapto-amine selected from the group consisting of (a) a compound having the formula

HS—R—NH—R' wherein R is alkylene having 2–4 carbon atoms and R' is selected from the group consisting of hydrogen and lower alkyl and (b) a compound having the formula

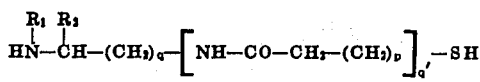

wherein $R_1$ is selected from the group consisting of hydrogen, —$CH_3$, —$C_2H_5$ and —$CH_2$—$CH_2OH$, $R_2$ is hydrogen, $q$ is an integer of 1–5, $q'$ is 0 or 1 and $p$ is 0 or 1, and (3) an amine having the formula

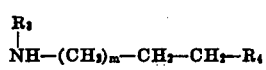

wherein $R_3$ is selected from the group consisting of hydrogen and lower alkyl, $R_4$ is selected from the group consisting of hydrogen, lower alkyl and

wherein $r$ and $r'$ are each lower alkyl or together form a radical selected from the group consisting of morpholinyl and piperidinyl and $m$ is 2–4, the molar ratio of mercapto-amine to monomer unit of said carboxylic acid anhydride homopolymer ranging between 0.33–1:1 and the molar ratio of said amine to monomer unit of said carboxylic acid anhydride homopolymer ranging between 0–0.66:1.

2. The solid polymer of claim 1 wherein the mercaptoamine is selected from the group consisting of β-mercaptoethylamine and N(β-aminoethyl) thioglycolamide.

3. The solid polymer of claim 1 wherein said amine is selected from the group consisting of butylamine, N,N-diethylpropylene diamine and N(β-aminoethyl)-morpholine.

4. A solid polymer, soluble in a solvent selected from the group consisting of water, lower alkanol and their mixtures, said polymer consisting essentially of the condensation reaction product of 1. an ethylenically unsaturated carboxylic acid anhydride homopolymer selected from the group consisting of poly(maleic anhydride), poly(itaconic anhydride), poly(acrylic anhydride), poly(acrylic-methacrylic anhydride) and poly(methacrylic anhydride), 2. a mercapto-amine selected from the group consisting of β-mercaptoethylamine, and N(β-aminoethyl) thioglycolamide and 3. an amine selected from the group consisting of N-butylamine, N,N-diethyl propylenediamine and diglycolamine, the molar ratio of said mercapto-amine to monomer unit of said ethylenically unsaturated carboxylic acid anhydride homopolymer ranging between 0.33–1:1 and the molar ratio of said amine to monomer unit of said ethylenically unsaturated carboxylic acid homopolymer ranging between 0–0066:1.

5. The solid polymer of claim 4 wherein said amine is N,N-diethyl propylene diamine in the form of its hydrochloride.

* * * * *